US009222624B2

(12) United States Patent  (10) Patent No.: US 9,222,624 B2
McCarty                    (45) Date of Patent:     Dec. 29, 2015

(54) STACKED DISK NOISE ABATEMENT DEVICE AND CONTROL VALVE COMPRISING SAME

(71) Applicant: FISHER CONTROLS INTERNATIONAL LLC, Marshalltown, IA (US)

(72) Inventor: Michael W. McCarty, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 13/836,031

(22) Filed: Mar. 15, 2013

(65) Prior Publication Data

US 2014/0264107 A1    Sep. 18, 2014

(51) Int. Cl.
*F16K 47/08* (2006.01)
*F17D 3/18* (2006.01)
*F16L 55/027* (2006.01)

(52) U.S. Cl.
CPC . *F17D 3/18* (2013.01); *F16K 47/08* (2013.01); *F16L 55/02718* (2013.01); *Y10T 137/86759* (2015.04)

(58) Field of Classification Search
CPC .............. F16K 47/08; F16L 55/02718; Y10T 137/86759
USPC ..................................... 137/625.33
See application file for complete search history.

(56) References Cited

U.S. PATENT DOCUMENTS

| | | | | |
|---|---|---|---|---|
| 3,397,794 A | * | 8/1968 | Toth et al. | 210/488 |
| 3,529,628 A | * | 9/1970 | Cummins | 137/625.3 |
| 3,856,049 A | * | 12/1974 | Scull | 138/42 |
| 3,978,891 A | * | 9/1976 | Vick | 138/42 |
| 4,068,683 A | * | 1/1978 | Self | 137/625.3 |
| 4,267,045 A | * | 5/1981 | Hoof | 210/322 |
| RE32,197 E | * | 7/1986 | Self | 251/127 |
| 5,687,763 A | * | 11/1997 | Steinke | 137/625.33 |
| 5,769,122 A | * | 6/1998 | Baumann et al. | 137/625.33 |
| 6,026,859 A | | 2/2000 | Wears et al. | |
| 6,095,196 A | * | 8/2000 | McCarty et al. | 138/42 |
| 6,161,584 A | | 12/2000 | Hemme et al. | |
| 6,244,297 B1 | * | 6/2001 | Baumann | 137/625.3 |
| 6,701,957 B2 | * | 3/2004 | McCarty et al. | 137/625.3 |

(Continued)

FOREIGN PATENT DOCUMENTS

| | | |
|---|---|---|
| GB | 1486440 A | 9/1977 |
| KR | 100477005 B1 | 3/2005 |
| KR | 101233653 B1 | 2/2013 |

OTHER PUBLICATIONS

International Search Report for International application No. PCT/US2014/022956, dated Jul. 7, 2014.

(Continued)

*Primary Examiner* — John Fox
(74) *Attorney, Agent, or Firm* — Marshall, Gerstein & Borun LLP

(57) ABSTRACT

A fluid pressure reduction device includes a radial and axial fluid flow path in stacked disks. The stacked disks form a fluid flow path including at least two pressure reduction stages, a first pressure reduction stage being oriented so that the fluid flowpath is directed radially outward and a second pressure reduction stage being oriented so that the fluid flowpath is directed radially inward.

20 Claims, 6 Drawing Sheets

(56) References Cited

U.S. PATENT DOCUMENTS

| | | | |
|---|---|---|---|
| 6,935,370 B2 * | 8/2005 | McCarty et al. | 137/625.3 |
| 7,766,045 B2 * | 8/2010 | Fagerlund et al. | 138/42 |
| 2005/0016604 A1 * | 1/2005 | Steinke et al. | 137/625.3 |
| 2009/0183790 A1 * | 7/2009 | Moore | 137/597 |

OTHER PUBLICATIONS

Written Opinion for International application No. PCT/US2014/022956, dated Jul. 7, 2014.

International Preliminary Report on Patentability for International application No. PCT/US2014/022956, dated Sep. 15, 2015.

* cited by examiner

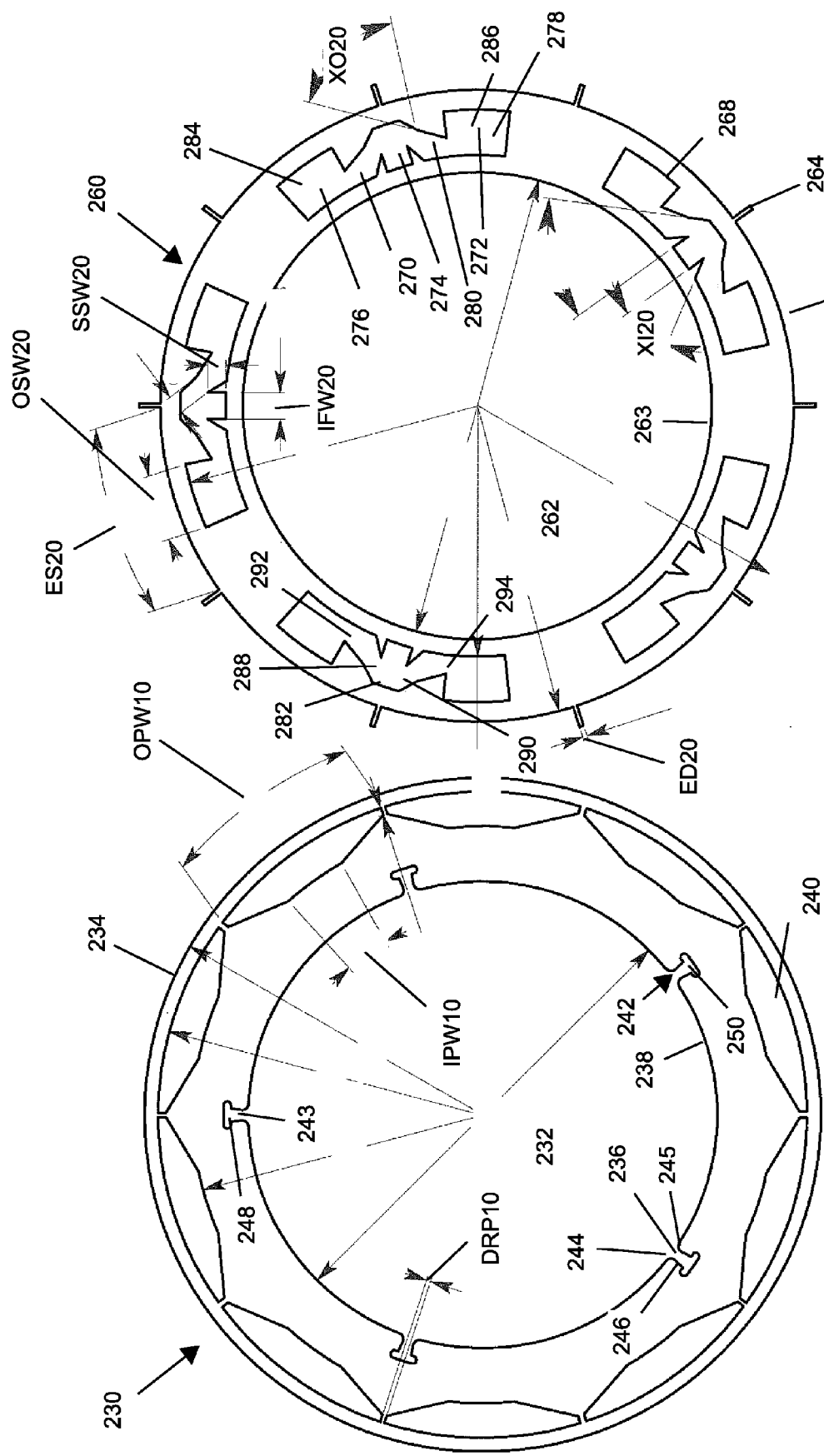

STACKED DISK NOISE ABATEMENT DEVICE AND CONTROL VALVE COMPRISING SAME

This invention relates to sound reduction devices for fluid control valves and in particular to sound reduction devices including a plurality of stacked disks that define a radial and axial fluid flow path.

BACKGROUND

In the control of fluid in industrial processes, such as oil and gas pipeline systems, chemical processes, etc., it is often necessary to reduce the pressure of a fluid. Adjustable flow restriction devices such as flow control valves and fluid regulators and other fixed fluid restriction devices such as diffusers, silencers, and other back pressure devices are utilized for this task. The purpose of the fluid control valve and/or other fluid restricting device in a given application may be to control flow rate or other process variables, but the restriction induces pressure reduction and unwanted noise inherently as a byproduct of its flow control function.

One device currently available for reducing pressure and noise of a fluid utilizes a tortuous fluid flow path. In the tortuous fluid flow path, the fluid flow is required to pass through a device having a plurality of restrictive fluid flow passages, each of which is constructed so as to require the fluid flow to change direction, typically at right angles, throughout the tortuous path as the fluid traverses from the device inlet to the device outlet in a planar, radially outward direction. These devices are commonly known as "tortuous path trim devices".

In such currently available tortuous path trim devices utilizing a tortuous path technique, the amount of noise reduction attainable is limited by the size (e.g., the overall envelope or external size) of the control valve. More specifically, as fluid flows through the stacked disks, it travels continuously outward in a planar, radial direction. However, such devices do not employ pressure recovery in the device.

SUMMARY OF THE INVENTION

In accordance with one exemplary aspect of the present invention, a fluid pressure reduction device includes a plurality of stacked disks having a first disk and a second disk. The first disk includes a hollow center portion, a first annular perimeter, a first fluid inlet portion disposed radially inward of a first stage restriction, a first stage recovery entry disposed radially outward of the first stage restriction, and a third stage recovery plenum disposed radially outward of the first stage recovery entry. The second disk includes a second hollow center portion, a second annular perimeter, a restriction and recovery plenum disposed between the hollow center portion and the second annular perimeter, the restriction and recovery plenum including a first stage recovery area, a second stage restriction fluidly connected to the first stage recovery area, and a second stage recovery plenum fluidly connected to the second stage restriction. A fluid flowpath is formed between the first fluid inlet portion and the third stage recovery plenum, the fluid flowpath passing through the first stage restriction, the first stage recovery area, the second stage restriction, and the second stage recovery plenum, before passing through the third stage recovery plenum, the second stage restriction directing the fluid flowpath radially inward, towards the second hollow center portion.

In another exemplary aspect of the present invention, a fluid control valve includes a valve body having a fluid inlet and a fluid outlet connected by a connecting passageway. A plurality of stacked disks is disposed in the connecting passageway, the plurality of stacked disks including a first disk and a second disk. The first disk includes a hollow center portion, a first annular perimeter, a first fluid inlet portion disposed radially inward of a first stage restriction, a first stage recovery entry disposed radially outward of the first stage restriction, and a third stage recovery plenum disposed radially outward of the first stage recovery entry. The second disk includes a second hollow center portion, a second annular perimeter, a restriction and recovery plenum disposed between the hollow center portion and the second annular perimeter, the restriction and recovery plenum including a first stage recovery area, a second stage restriction fluidly connected to the first stage recovery area, and a second stage recovery plenum fluidly connected to the second stage restriction. A fluid flowpath is formed between the first fluid inlet portion and the third stage recovery plenum, the fluid flowpath passing through the first stage restriction, the first stage recovery area, the second stage restriction, and the second stage recovery plenum, before passing through the third stage recovery plenum, the second stage restriction directing the fluid flowpath radially inward, towards the second hollow center portion.

In yet another exemplary aspect of the present invention, a fluid control valve includes a plurality of stacked disks that define a fluid flowpath therethrough. The fluid flowpath includes at least two pressure reduction stages. A first pressure reduction stage is oriented so that the fluid flowpath is directed radially outward and a second pressure reduction stage is oriented so that the fluid flowpath is directed radially inward.

In further accordance with any one or more of the foregoing aspects, a fluid control valve (or a fluid pressure reduction device) may further include any one or more of the following preferred forms.

In some preferred forms, the fluid control valve or fluid pressure reduction device may include a third stage restriction between the second stage recovery plenum and the third stage recovery plenum, the third stage restriction directing the fluid flow path in an axial direction from the second disk to the first disk. In other preferred forms, the fluid control valve or fluid pressure reduction device may include a fluid exit slot disposed radially outward of the second stage recovery plenum. In yet other preferred forms, the fluid control valve or fluid pressure reduction device may include the first stage recovery area being fluidly connected to a first second stage restriction and to a second second stage restriction. In yet other preferred forms, the fluid control valve or fluid pressure reduction device may include the second stage restriction being angled with respect to the first stage recovery area. In yet other preferred forms, the fluid control valve or fluid pressure reduction device may include the fluid inlet portion having substantially parallel sides. In yet other preferred forms, the fluid control valve or fluid pressure reduction device may include a fluid inlet portion having a venturi (i.e., non-parallel sides) shape. In yet other preferred forms, the fluid control valve or fluid pressure reduction device may include a plurality of fluid inlet slots, each fluid inlet slot being fluidly connected to a single first stage recovery area. In yet other preferred forms, the fluid control valve or fluid pressure reduction device may include each first stage recovery area being fluidly connected to two second stage restrictions. In yet other preferred forms, the fluid control valve or fluid pressure reduction device may include a plurality of first disks and a plurality of second disks arranged in an alternating fashion.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 5 is a top plan view of an alternate embodiment of an first disk;

FIG. 6 is a top plan view of an alternate embodiment of a second disk; and

DETAILED DESCRIPTION

Figure 1:
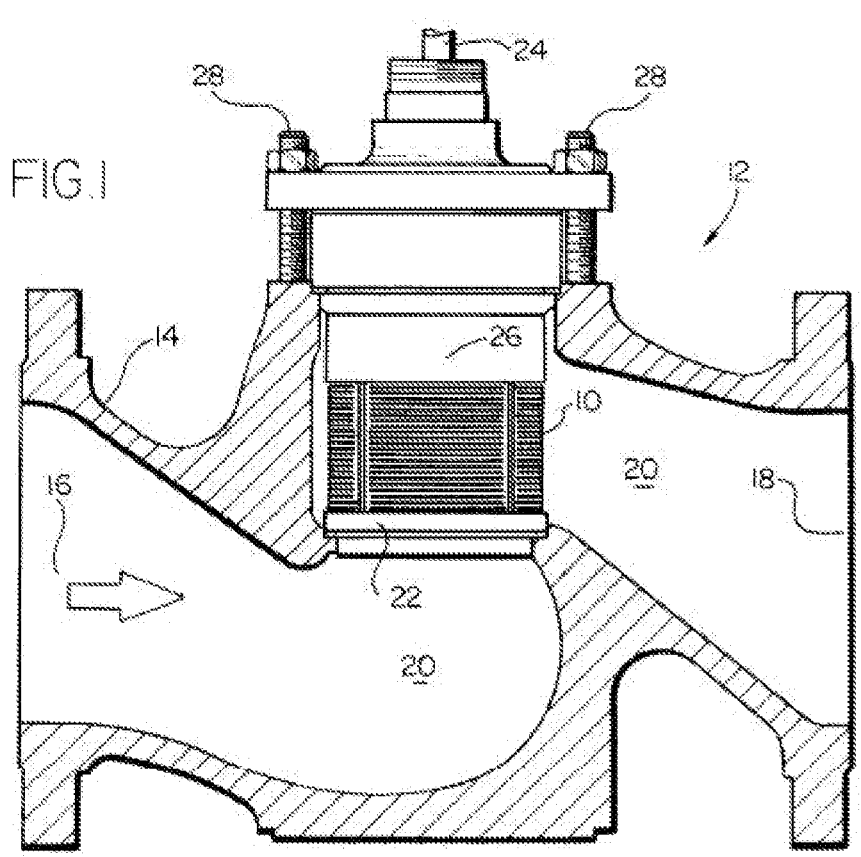
FIG. 1 is a cross-sectional view illustrating a fluid control valve containing a valve trim in the form of stacked disks forming a fluid pressure reduction device in accordance with the present invention.

Referring now to FIG. 1, one embodiment of a fluid pressure and sound reduction device is illustrated that includes a plurality of stacked disks that form a radial and axial fluid flow path through a valve trim. The valve trim takes the form of a valve cage 10 having a plurality of stacked disks that is mounted within a fluid control valve 12 including a valve body 14 having a fluid inlet 16, a fluid outlet 18, and a connecting passageway 20 through the valve body 12.

A seat ring 22 is mounted within the connecting passageway 20 and the seat ring 22 cooperates with a valve plug (not shown) that is controlled by a valve operating member, such as a valve stem 24, to control fluid flow into the interior and through the exterior of the valve cage 10. The valve cage 10 may be maintained within the valve 12 by mounting means such as cage retainer 26 and mounting bolts 28 engaging a valve bonnet.

Generally, the disclosed valve cage 10, in the form of a plurality of disks, efficiently lowers acoustical emissions of control valves by staging pressure drops and recovery zones in a radial and axial fluid flow path that includes at least one reverse flow path that directs radial outward flow back radially inward, towards an interior of the valve cage 10. In other words, the at least one reverse flow path has at least a component of flow that is directed radially inward while simultaneously staging pressure drops within the valve cage 10. By using radially reversing flow paths within the pressure drop stages the valve cage 10 does not increase a thickness or radius of the valve cage 10 for a given amount of pressure reduction or noise reduction. As a result, the disclosed valve cage 10 advantageously employs more noise reduction stages that increase noise reduction without increasing the size of the valve cage 10, which would result in a need for a larger valve body or envelope. Further, in fluid pressure reduction devices exhibiting high pressure drop ratios (e.g., greater than 0.83), the present invention provides an increased number of pressure stages for a given valve body size without reducing flow capacity (i.e., $C_v$) of the valve. In one preferred embodiment, the radially reversing flow portion of the radial and axial flow path is confined to a single disk. In other words, the fluid flow path does not radially reverse direction between disks. In other embodiments, the radially reversing flow portion of the radial and axial flow path may extend between disks.

Figure 2:
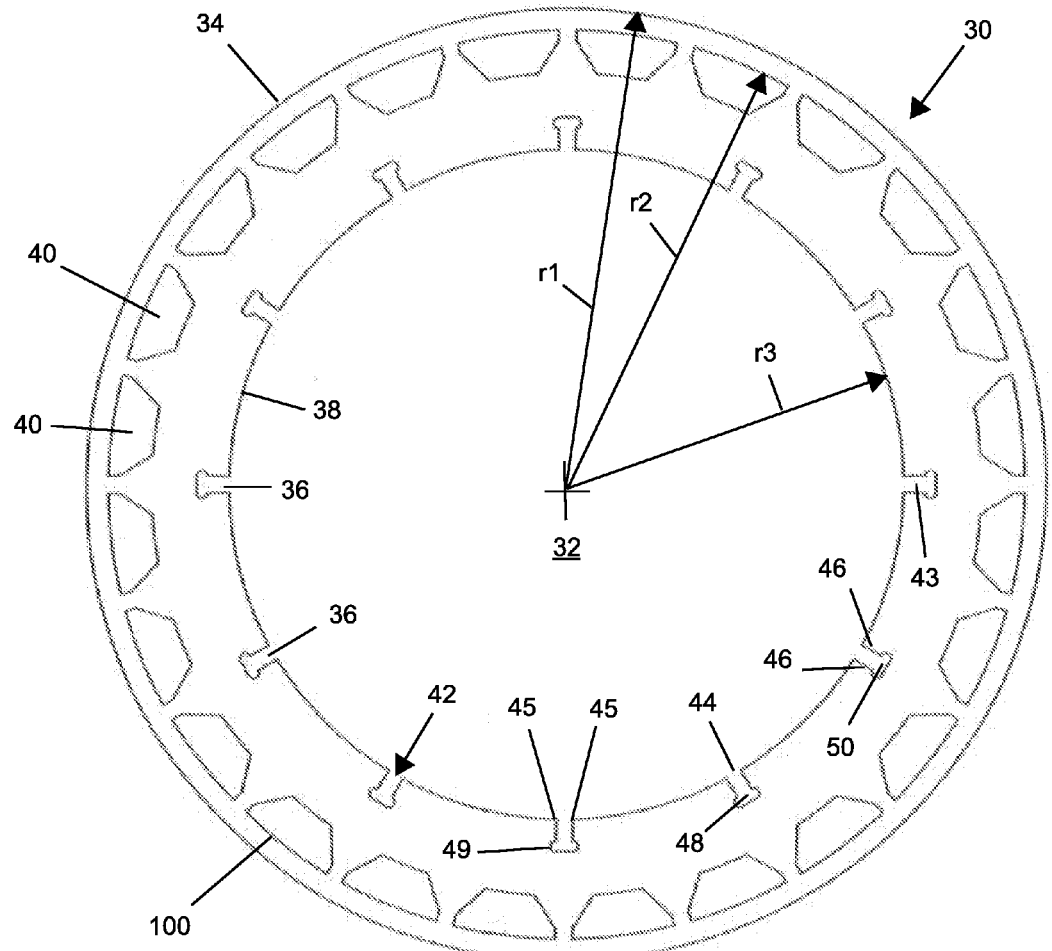
FIG. 2 is a top plan view of a first disk in the stacked disks of FIG. 1.
Figure 3:
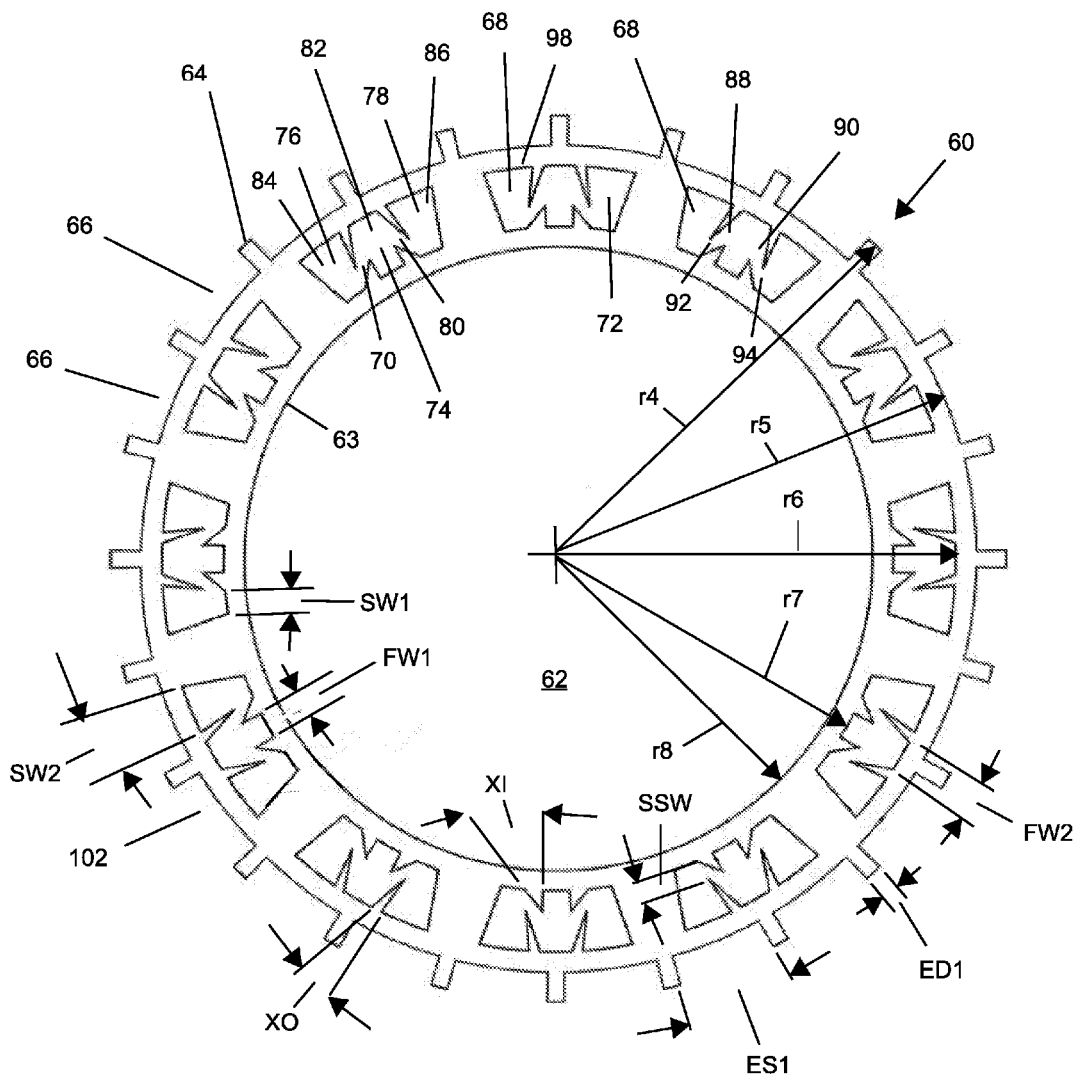
FIG. 3 is a top plan view of a second disk in the stacked disks of FIG. 1.

The valve cage 10 includes a plurality of stacked disks in an alternating disk configuration including a first disk, such as an entry disk 30, which is illustrated in FIG. 2, alternating with a second disk, such as an exit disk 60, which is illustrated in FIG. 3. The entry disk 30 includes a hollow center portion 32 and an annular perimeter 34. A plurality of fluid inlet slots 36 are disposed about an inner surface 38 of the entry disk 30, each fluid inlet slot 36 partially extending from the hollow center portion 32 towards the annular perimeter 34. A plurality of third stage recovery plenums 40 is disposed between the inner surface 38 and the annular perimeter 34.

Figure 4:
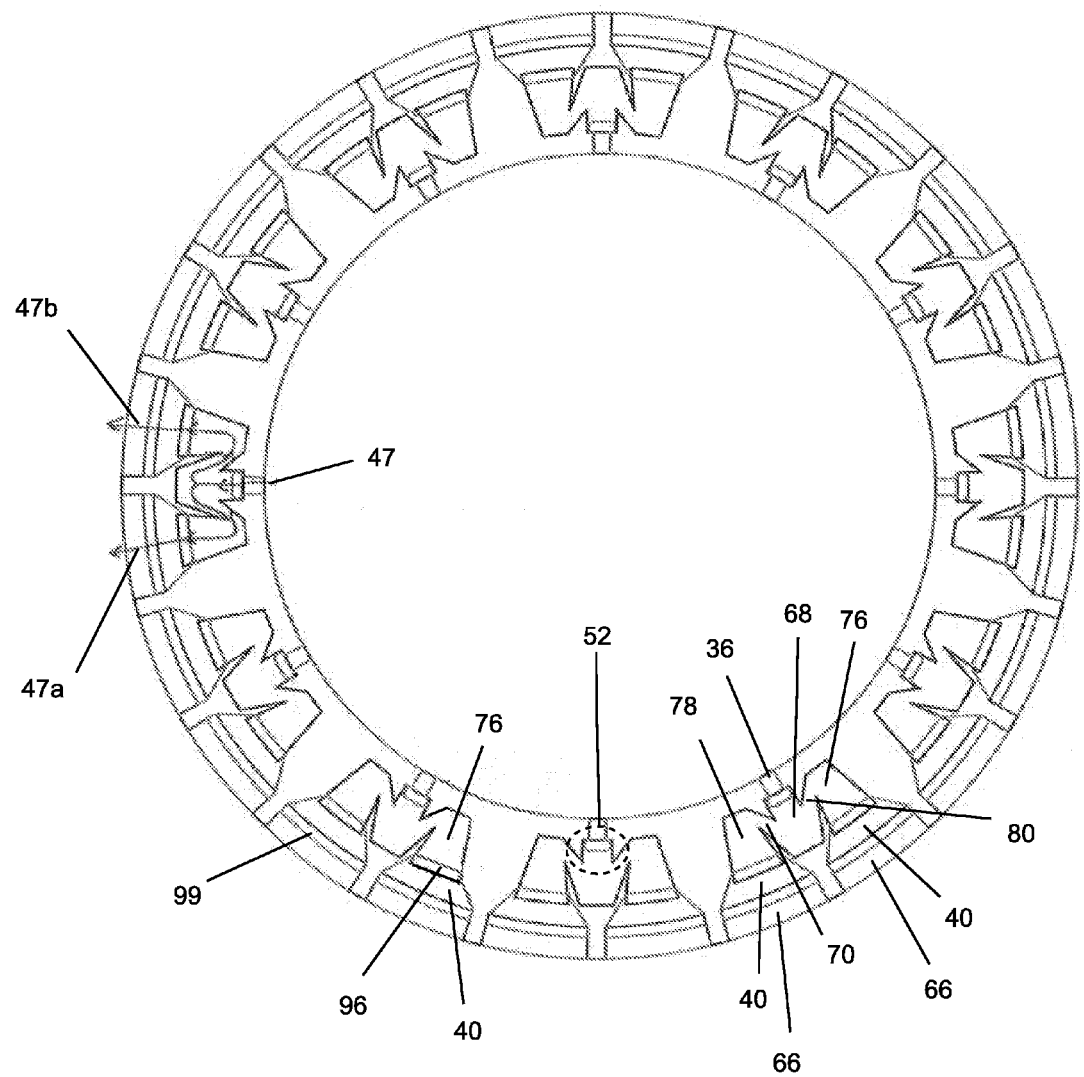
FIG. 4 is a top plan view of the first and second disks stacked upon one another.

The fluid inlet slots 36 include a fluid inlet portion 42 having an inlet opening 44 and a pair of substantially parallel sides 46. The substantially parallel sides 46 may terminate in radiused junctions 45 proximate the inlet opening 44. However, it should be appreciated by one skilled in the art that such inlet openings can be formed as venturis having non-parallel sides without departing from the spirit and scope of the present invention. The fluid inlet portion 42 forms a first stage restriction 43 in a fluid flow path 47 (FIG. 4). The first stage restriction 43 reduces pressure of fluid flowing through the fluid flow path 47. The substantially parallel sides 46 lead from the inlet opening 44 to a first recovery entry 48. The first recovery entry 48 includes a chamber 50 having a width that is larger than a distance between the two substantially parallel sides 46. The first recovery entry 48 forms a portion of a first stage recovery plenum 52 (FIG. 4).

In one embodiment, the entry disk 30 may include an outer radius r1 of approximately 3.875 inches (9.8 cm), an intermediate radius r2 of approximately 3.73 inches (9.5 cm), and an inner radius r3 of approximately 2.6875 inches (6.8 cm); the radiused junctions 45 may have a radius of approximately 0.075 inches (0.2 cm); the entry inlet 44 may have a width of approximately 0.122 inches (0.3 cm); the chamber 50 may have a width of approximately 0.308 inches (0.8 cm); and the chamber may have radiused sides 49 having a radius of approximately 0.043 inches (0.1 cm).

The exit disk 60 includes a hollow center portion 62, an inner surface 63, and an annular perimeter 64. A plurality of fluid exit slots 66 is disposed about the annular perimeter 64. A plurality of restriction and recovery plenums 68 is disposed between the inner surface 63 and the annular perimeter 64. The restriction and recovery plenums 68 form portions of the first stage recovery plenum 52 (FIG. 4), a second stage restriction 70, and a second stage recovery plenum 72. The second stage recovery plenum 72 is fluidly connected to the third stage recovery plenum 40 in the entry disk 30.

The restriction and recovery plenums 68 each include a first stage recovery area 74 that is fluidly connected to two second stage recovery areas 76, 78 by two second stage restrictions 70, 80, respectively. The first stage recovery area 74 includes a radially extending chamber 82. The two second stage recovery areas 76, 78, likewise, include radially extending chambers 84, 86, respectively. The second stage restrictions 70, 80 comprise chambers that have both an annular component and a radial component. The second stage restrictions 78, 80, each have a junction 88, 90, respectively, with the first stage recovery area 74 that is located radially outward of a junction 92, 94, respectively, with the second stage recovery areas 76, 78, respectively. As a result, fluid flowing through the restriction and recovery plenums 68 flows radially outward into the first stage recovery area 74 and then into the two second stage restrictions 70, 80 by being split into two flow paths 47a, 47b (FIG. 4). After entering the two second stage restrictions 70, 80, fluid flows in a radially inward direction to the second recovery areas 76, 78. The fluid flow in the two second stage restrictions 70, 80 may have an annular component, but the fluid flow also has a radially inward component. In other embodiments, the fluid flow in the second stage restrictions may be entirely radially inward. By reversing the flow paths from a radially outward direction to (at least partially) a radially inward direction, the disclosed valve cage 10 increases the number of pressure reduction stages without radially enlarging the valve cage 10.

A third stage restriction 96 (FIG. 4) is formed between the second stage recovery area 76 and the third stage recovery area 40. More specifically, the third stage restriction 96 is formed by a radial end wall 98 (FIG. 3) in the second stage recovery area 76, which causes the fluid flow path to change direction into an axial direction into an adjacent entry disk 30.

A fourth stage restriction 99 is formed by a radial end wall 100 (FIG. 2) of the third stage recovery plenum 40, which causes the fluid flow path to again change direction from a primarily radial direction through the third stage recovery plenum 40 to an axial direction into an exit slot 66 in an adjacent exit disk 60. The exit slot 66 forms a fourth stage recovery area 102 (FIG. 3).

As illustrated in FIG. 4, each fluid inlet slot 36 is fluidly connected to a single restriction and recovery plenum 68. However, each restriction and recovery plenum 68 is fluidly connected to two different third stage recovery plenums 40 because the restriction and recovery plenum 68 separates fluid flow into two flow paths 47a, 47b. The restriction and recovery plenum 68 also forces fluid to change direction from a radial outward direction to a radial inward direction as fluid flows into the second stage restrictions 70, 80. Each second stage recovery area 76, 78 is fluidly connected to a single third stage recovery plenum 40. Likewise, each third stage recovery plenum 40 is fluidly connected to a single exit slot 66.

Generally speaking, each restriction (e.g., the first stage restriction 43, the second stage restriction 70, 80, the third stage restriction 96, and the fourth stage restriction 98) comprises a reduction in cross-sectional flow area along the fluid flow path 47, while each pressure recovery area or plenum (i.e., the first stage recovery area 52, the second stage recovery area 76, 78, the third stage recovery plenum 40, and the exit slot 66) comprises an increasing cross-sectional flow area along the fluid flow path 47, 47a, 47b.

In one embodiment, the second stage restrictions 70, 80 may form an outer angle XO relative to the first stage recovery area 74 of approximately 14°. Similarly, the second stage restrictions 70, 80 may form an inner angle XI relative to the first stage recovery area 74 of approximately 40°. In a similar embodiment, the exit disk 60 may have an outer radius r4 of approximately 3.875 inches (9.8 cm), an exit slot radius r5 of approximately 3.615 inches (9.2 cm), an outer first stage recovery area radius r6 of approximately 3.435 inches (8.7 cm), an inner first stage recovery area radius r7 of approximately 2.9 inches (7.4 cm), and an inner radius r8 of approximately 2.725 inches (5.8 cm). An inner second stage recovery area width SW1 may be approximately 0.2 inches (0.5 cm) and an outer second stage recovery area width SW2 may be approximately 0.432 inches (1.1 cm). An inner first stage recovery area width FW1 may be approximately 0.234 inches (0.6 cm) and an outer first stage recovery area width FW2 may be approximately 0.278 inches (0.7 cm). A width of the fluid exit slot ES1 may be approximately 0.864 inches (2.2 cm) and a distance between fluid exit slots ED1 may be approximately 0.149 inches (0.4 cm). Additionally, the second stage restriction 70, 80 may have a width SSW of approximately 0.191 inches (0.5 cm). The foregoing dimensions are exemplary only and these dimensions and angles may be scaled up or down, or otherwise adjusted based upon the needed pressure recovery for a particular system.

When stacked, a first disk 30 and a second disk 60 having the dimensions listed above produces a pressure recovery factor of approximately 0.96.

A second embodiment of an entry disk 230 and an exit disk 260 are illustrated in FIGS. 5 and 6. The entry disk 230 and the exit disk 260 are similar to the entry disk 30 and the exit disk 60 of FIGS. 2 and 3. Like structures in FIGS. 5 and 6 are numbered exactly 200 greater than the same structures in FIGS. 2 and 3. The entry disk 230 and the exit disk 260 of FIGS. 5 and 6 have different dimensions than the embodiment of FIGS. 2 and 3. When stacked, the entry disk 230 and the exit disk 260 of FIGS. 5 and 6 produce a pressure recovery factor of approximately 0.92.

Like the previous embodiments, the entry disk 230 includes a hollow center portion 232 and an annular perimeter 234. A plurality of fluid inlet slots 236 are disposed about an inner surface 238 of the entry disk 230. A plurality of third stage recovery plenums 240 is disposed between the inner surface 238 and the annular perimeter 234. In the embodiment of FIG. 5, the entry disk includes fewer fluid inlet slots 236 and fewer third stage recovery plenums than the embodiment of FIG. 2 and the third stage recovery plenums are wider.

The fluid inlet slots 236 include a fluid inlet portion 242 having an inlet opening 244 and a pair of substantially parallel sides 246. The substantially parallel sides 246 may terminate in radiused junctions 245 proximate the inlet opening 244. The fluid inlet portion 242 forms a first stage restriction 243. The substantially parallel sides 246 lead from the inlet opening 242 to a first recovery entry 248. The first recovery entry 248 includes a chamber 250 having a width that is larger than a distance between the two substantially parallel sides 246. The first recovery entry 248 forms a portion of a first stage recovery plenum.

In the embodiment of FIG. 5, the third stage recovery plenums 250 may have an inner plenum width IPW10 of approximately 0.746 inches (1.9 cm) and an outer plenum width OPW10 of approximately 2.324 inches (5.9 cm). A distance between the third stage recovery plenums DRP10 may be approximately 0.048 inches (0.1 cm).

The exit disk 260 includes a hollow center portion 262, an inner surface 263, and an annular perimeter 264. A plurality of fluid exit slots 266 is disposed about the annular perimeter 264. A plurality of restriction and recovery plenums 268 is disposed between the inner surface 263 and the annular perimeter 264. The restriction and recovery plenums 268 form portions of the first stage recovery plenum, a second stage restriction 270, and a second stage recovery plenum 272. The second stage recovery plenum 272 is fluidly connected to the third stage recovery plenum 240 in the entry disk 230.

The restriction and recovery plenums 68 each include a first stage recovery area 274 that is fluidly connected to two second stage recovery areas 276, 278 by two second stage restrictions 270, 280, respectively. The first stage recovery area 274 includes a radially extending chamber 282. The two second stage recovery areas 276, 278, likewise, include radially extending chambers 284, 286, respectively. The second stage restrictions 270, 280 comprise chambers that have both an annular component and a radial component. The second stage restrictions 278, 280, each have a junction 288, 290, respectively, with the first stage recovery area 274 that is located radially outward of a junction 292, 294, respectively, with the second stage recovery areas 276, 278, respectively.

As a result, fluid flowing through the restriction and recovery plenums 268 flows radially outward into the first stage recovery area 274 and then into the two second stage restrictions 270, 280 by being split into two flow paths. After entering the two second stage restrictions 270, 280, fluid flows in a radially inward direction to the second recovery areas 276, 278. The fluid flow in the second second stage restrictions 270, 280 may have an annular component, but the fluid flow also has a radially inward component. In other embodiments, the fluid flow in the second stage restrictions may be entirely radially inward.

In the embodiment illustrated in FIG. 6, the second stage restrictions 270, 280 may form an outer angle XO20 relative to the first stage recovery area 274 of approximately 63°. Similarly, the second stage restrictions 270, 280 may form an inner angle XI20 relative to the first stage recovery area 274 of approximately 31°. An outer second stage recovery area width OSW20 may be approximately 0.765 inches (1.9 cm). An inner first stage recovery area width IFW20 may be approximately 0.308 inches (0.8 cm). A width of the fluid exit slot ES20 may be approximately 2.234 inches (5.7 cm) and a distance between fluid exit slots ED20 may be approximately 0.05 inches (0.1 cm). Additionally, the second stage restriction 270, 280 may have a width SSW20 of approximately 0.211 inches (0.5 cm). The foregoing dimensions are exemplary only and these dimensions and angles may be scaled up or down, or otherwise adjusted based upon the needed pressure recovery for a particular system.

While at least to embodiments of an entry disk 30, 230, and at least two embodiments of an exit disk 60, 260 are illustrated herein, the dimensions and angles of the various structural elements of the entry disk 30, 230 and of the exit disk 260 may be varied to achieve a desired pressure recovery factor.

Figure 7:
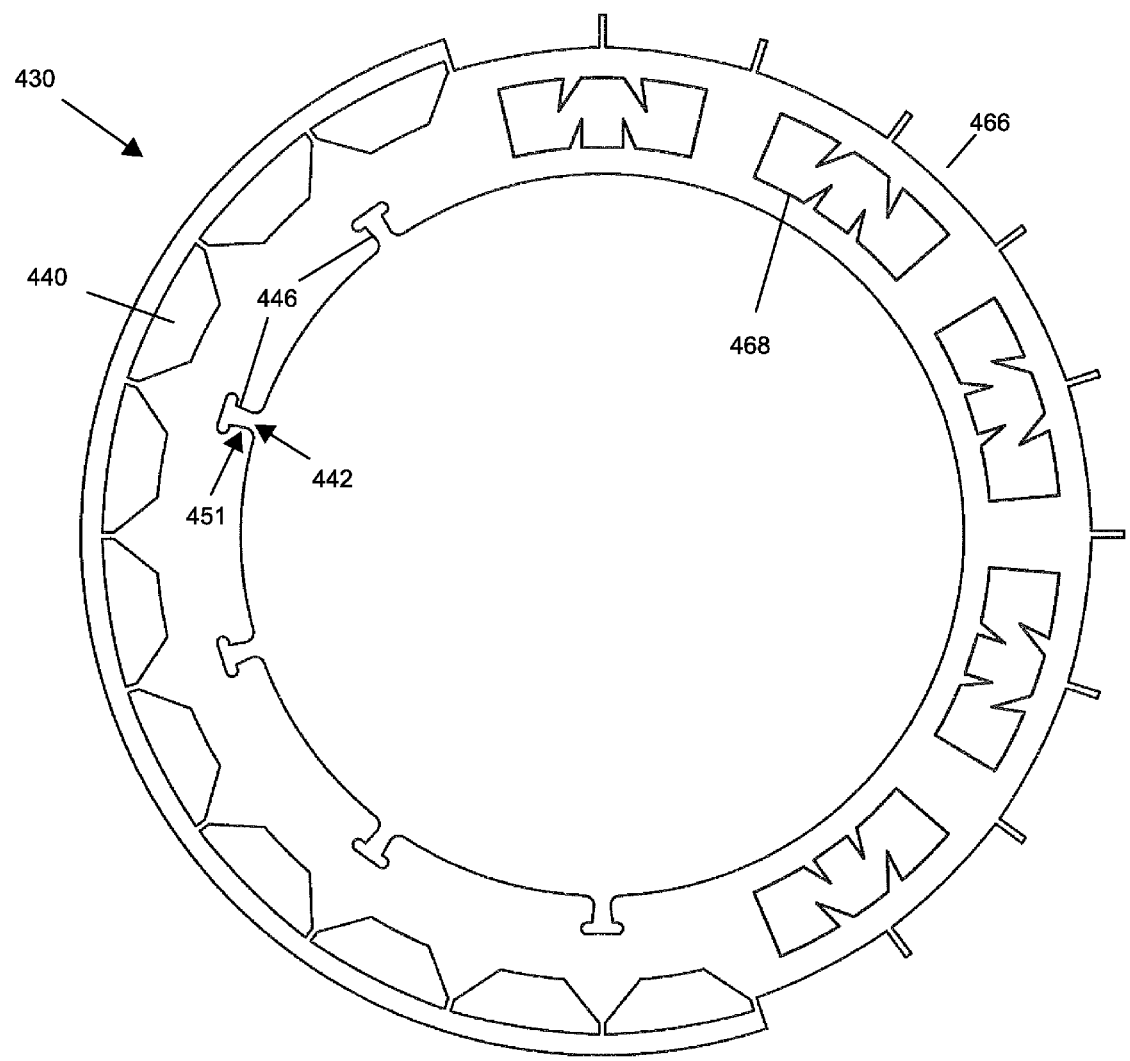
FIG. 7 is a top plan view of an alternate embodiment of a disk, the alternate embodiment combining at least three flow recovery zones into one disk.

Turning now to FIG. 7, an embodiment of a combination entry and exit disk 430 is illustrated. The combination entry and exit disk 430 combines the structural elements of the entry disk 30, 230 on one half and the structural elements of the exit disk 60, 260 on the other half. For example, on one half (e.g., an entry half), the entry and exit disk 430 includes a plurality of fluid inlet portions 442 and a plurality of third stage recovery plenums 440. The other half (e.g., an exit half) may include a plurality of restriction and recovery plenums 468 and a plurality of fluid exit slots 466. Other structural elements of the entry disk 30, 230 and of the exit disk 60, 260 are included in respective halves of the entry and exit disk 430, although all of the structural elements are not numbered in FIG. 7 with individual reference numerals. As a result, the valve cage 10 may be formed from a plurality of the entry and exit disks 430, which are sequentially oriented so that an entry half of one entry and exit disk 430 is disposed between an exit half of adjacent entry and exit disks 430, and vice versa. One difference in the embodiment of the entry disk 430 of FIG. 7 from the embodiments of FIGS. 2-6, is that the side walls 446 of at least one of the fluid inlet portions 442 converge and then diverge, forming a venturi section 451.

Generally speaking, a first pressure recovery stage is formed by the fluid inlet portions 42, 242, the chambers 50, 250, and the first stage recovery areas 74, 274. Fluid flows through the first pressure recovery stage in a radially outward direction. A second pressure recovery stage is formed by the second stage restrictions 70, 270, 80, 280 and the second stage recovery areas 76, 276, 78, 278. Fluid flowing through the second pressure recovery stage has, at least partially, a radially inward directional component. A third pressure recovery stage is formed by the third stage restriction 96 and the third stage recovery area 40, 240. Fluid flowing through the third pressure recovery stage flows in a radially outward direction. As discussed above, by reversing fluid flow, at least partially, from a radially outward direction to a radially inward direction, the disclosed entry disks 30, 230 and exit disks 60, 260 (and the disclosed combination entry and exit disk 430) advantageously allow more pressure recovery stages to be located in a given radial distance. As a result, the disclosed disks may be used to form a valve cage having a smaller diameter than traditional tortuous path valve cages.

Although certain noise abatement devices and fluid control valves have been described herein in accordance with the teachings of the present disclosure, the scope of the appended claims is not limited thereto. On the contrary, the claims cover all embodiments of the teachings of this disclosure that fairly fall within the scope of permissible equivalents.

What is claimed is:

1. A fluid pressure reduction device comprising:
   a plurality of stacked disks, the plurality of disks including;
      a first disk having a first hollow center portion, a first annular perimeter, a first fluid inlet portion disposed radially inward of a first stage restriction, a first stage recovery entry disposed radially outward of the first stage restriction, and a third stage recovery plenum disposed radially outward and separated from the first stage recovery entry; and
      a second disk having a second hollow center portion, a second annular perimeter, and a restriction and recovery plenum disposed between and separated from the second hollow center portion and the second annular perimeter, the restriction and recovery plenum including a first stage recovery area, a second stage restriction fluidly connected to the first stage recovery area, and a second stage recovery plenum fluidly connected to the second stage restriction;
   wherein a fluid flowpath is formed between the first fluid inlet portion and the third stage recovery plenum, the fluid flowpath passing radially through the first stage restriction, axially into the first stage recovery area, radially through the second stage restriction and the second stage recovery plenum, before passing axially into the third stage recovery plenum, the second stage restriction directing the fluid flowpath radially inward, towards the second hollow center portion, and
   wherein each restriction comprises a reduction in cross-sectional flow area along the fluid flowpath.

2. The fluid pressure reduction device of claim 1, further comprising a third stage restriction between the second stage recovery plenum and the third stage recovery plenum, the third stage restriction directing the fluid flow path in an axial direction from the second disk to the first disk.

3. The fluid pressure reduction device of claim 1, wherein the second disk comprises a fluid exit slot disposed radially outward of the second stage recovery plenum.

4. The fluid pressure reduction device of claim 1, wherein the first stage recovery area is fluidly connected to a first second stage restriction and to a second second stage restriction, thereby splitting the fluid flow path into two fluid flowpaths.

5. The fluid pressure reduction device of claim 1, wherein the second stage restriction is angled with respect to the first stage recovery area.

6. The fluid pressure reduction device of claim 5, wherein the angle is approximately 40 degrees.

7. The fluid pressure reduction device of claim 1, wherein the fluid inlet portion includes substantially parallel sides.

8. The fluid pressure reduction device of claim 1, wherein the first fluid inlet portion includes a venturi section having side walls that converge and then diverge.

9. The fluid pressure reduction device of claim 1, wherein the first disk includes a plurality of fluid inlet slots, each fluid inlet slot being fluidly connected to a single first stage recovery area.

10. The fluid pressure reduction device of claim 1, wherein each first stage recovery area is fluidly connected to two second stage restrictions.

11. The fluid pressure reduction device of claim 10, wherein each second stage restriction is fluidly connected with a single third stage recovery plenum.

12. The fluid pressure reduction device of claim 1, wherein the plurality of stacked disks includes a plurality of first disks and a plurality of second disks arranged in an alternating fashion.

13. A fluid control valve comprising:
  a valve body having a fluid inlet and a fluid outlet connected by a connecting passageway; and
  a plurality of stacked disks disposed in the connecting passageway, the plurality of stacked disks including;
    a first disk having a first hollow center portion, a first annular perimeter, a first fluid inlet portion disposed radially inward of a first stage restriction, a first stage recovery entry disposed radially outward of the first stage restriction, and a third stage recovery plenum disposed radially outward and separated from the first stage recovery entry; and
    a second disk having a second hollow center portion, a second annular perimeter, and a restriction and recovery plenum disposed between and separated from the second hollow center portion and the second annular perimeter, the restriction and recovery plenum including a first stage recovery area, a second stage restriction fluidly connected to the first stage recovery area, and a second stage recovery plenum fluidly connected to the second stage restriction;
  wherein a fluid flowpath is formed between the first fluid inlet portion and the third stage recovery plenum, the fluid flowpath passing radially through the first stage restriction, axially into the first stage recovery area, radially through the second stage restriction and the second stage recovery plenum, before passing axially into the third stage recovery plenum, the second stage restriction directing the fluid flowpath radially inward, towards the second hollow center portion, and
  wherein each restriction comprises a reduction in cross-sectional flow area along the fluid flowpath.

14. The fluid control valve of claim 13, wherein the first stage recovery area is fluidly connected to a first second stage restriction and a second second stage restriction, thereby splitting the fluid flow path into two fluid flowpaths.

15. The fluid control valve of claim 13, wherein the second stage restriction is angled with respect to the first stage recovery area.

16. The fluid control valve of claim 15, wherein the angle is approximately 31 degrees.

17. The fluid control valve of claim 13, wherein the fluid inlet portion includes substantially parallel sides.

18. The fluid control valve of claim 13, wherein the first disk includes a plurality of fluid inlet slots, each fluid inlet slot being fluidly connected to a single first stage recovery area.

19. The fluid control valve of claim 13, wherein each first stage recovery area is fluidly connected to two second stage restrictions.

20. The fluid control valve of claim 19, wherein each second stage restriction is fluidly connected with a single third stage recovery plenum.

* * * * *